INVENTORS
WILLIAM J. KERWIN
STANLEY G. SCOTT

INVENTORS
WILLIAM J. KERWIN
STANLEY G. SCOTT

BY
ATTORNEYS

United States Patent Office 3,423,608
Patented Jan. 21, 1969

3,423,608
NONMAGNETIC THERMAL MOTOR FOR
A MAGNETOMETER
William J. Kerwin, Sunnyvale, and Stanley G. Scott, menlo Park, Calif., assignors to the United States of America as represented by the Administrator of the National Aeronautics and Space Administration
Filed Aug. 2, 1965, Ser. No. 476,763
U.S. Cl. 310—4                         1 Claim
Int. Cl. G01r 33/02; H02n 7/00

ABSTRACT OF THE DISCLOSURE

A nonmagentic thermal motor for moving a magnetometer from one predetermined calibration position to another. Two spiral bimetallic elements are series-connected between a casing and a rotatable shaft. An electric heater is situated within each bimetallic element. A frame fastened to the casing rotatably supports an output shaft. A crank arm is attached to each of the shafts and the arms are interconnected by a spring. The arms and spring cause a magnetometer coupled to the output shaft to assume a first or second position. The positions are alternated by selectively energizing the bimetallic elements.

---

The invention described herein may be manufactured and used by or for the Government of the United States of America for governmental purposes without the payment of any royalties thereon or therefor.

This invention relates to thermal motors and more particularly to a nonmagnetic thermal motor for driving a magnetometer selectively to different test positions.

A magnetometer of the type under consideration is a conventional apparatus comprising a core of magnetic material surrounded by a gating coil and a pickup coil. The gating coil is driven by an alternating current source which periodically saturates and desaturates the magnetic core. When the core is saturated by the field from the gating coil, it represents a permeability of unity to the ambient magnetic field which is to be measured. When the magnetic core is desaturated as regards the gating coil it represents its normal high permeability to the ambient magnetic field. Therefore, the lines of flux of the ambient magnetic field through the core vary cyclically from high when the core is desaturated to low when the core is saturated. The changing flux of the ambient magnetic field through the core creates a voltage in the pickup coil and measurement of this voltage provides a measure of the strength of the ambient magnetic field.

Magnetometers of the type described are sensitive along the axis of the magnetic core. The reading of the measurement of the ambient magnetic field when the core is arranged in one position relative to the ambient field should be of the same magnitude as the reading taken when the core is turned 180°. If the readings are not the same it indicates that the apparatus is not working properly. Thus, in magnetometer apparatus it is customary to provide means for turning the magnetometer through 180° to check the operation. Even though the apparatus may not be operating properly, as indicated by different readings at the opposite 180° positions, a correct reading can be obtained by introducing a correction factor. The correction factor is obtained by subtracting the readings given at the opposite 180° positions and dividing this quantity by two to obtain the correction factor which is added to the reading taken at the low reading position or subtracted from the reading which is taken at the high reading position.

The problem is to obtain a means for changing the position of the magnetometer without introducing any magnetic fields which would of course introduce errors into the magnetometer reading.

Accordingly it is an object of the present invention to provide a motor for changing the position of a magnetometer without introducing any magnetic field as a result of the motor action.

The type of motor selected to provide the desired result is a thermally operated motor comprising bimetallic motor elements. The general principle of thermally operated bimetallic motor elements is not new. The two metals in the bimetallic element have different coefficients of thermal expansion so that when the element is heated one of the metals will expand with respect to the other and cause a bending action in the element. However, the metals used in conventional bimetallic motor elements are normally magnetic metals, and magnetic fields introduced by such magnetic materials can interfere with correct operation of the magnetometer. Accordingly, it is further object of the invention to provide a thermal motor wherein the materials of the bimaterial elements are nonmagnetic.

Another object of the invention is to provide a thermal motor which has a bimaterial element for driving the motor output in one direction and a bimaterial element for driving the motor output in the opposite direction, and means for arranging the two bimaterial elements so that one element is not required to overcome the inherent spring force of the other. In other words the two bimaterial elements are connected in series between the motor casing and the motor output shafts. In conventional thermal motors having oppositely driving bimetallic thermal elements, each of the elements must overpower the spring force of the other in driving the motor output in its respective direction. In other words convenional thermal motors connect the bimaterial elements in parallel between the motor casing and the motor output shaft.

A further object of the invention is to provide a thermal motor which automatically compensates for changes in ambient temperature.

An additional object of the invention is to provide a thermal motor with separate heaters for the bimaterial elements and making the heaters counterwound bifilar resistance coils to avoid the generation of any magnetic fields from the resistance heating current.

A further object of the invention is to provide a thermal motor and magnetometer apparatus of the type described having positive means for moving the magnetometer quickly and accurately between the desired operating positions.

An additional object of the invention is to provide a thermal motor construction which conserves heat and requires relatively low operating power.

Other and further objects and features of advantage will become apparent from the following detailed description wherein reference is made to the accompanying drawings in which.

Figure 2:
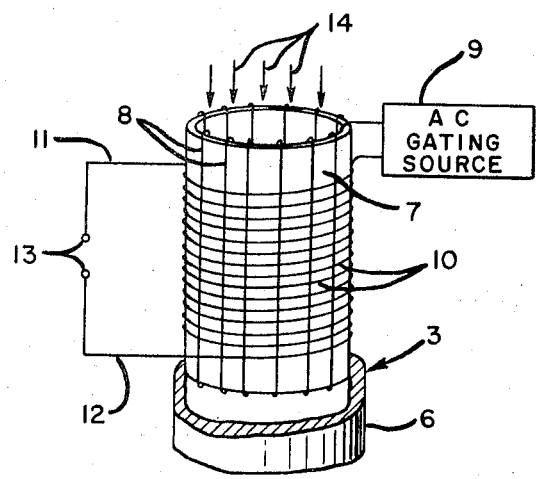
FIGURE 2 is an enlarged perspective view of a portion of FIGURE 1 showing the magnetometer construction in detail.

Referring in more detail to the drawings the thermal motor and magnetometer apparatus comprises a thermal motor indicated generally at 1 and a magnetometer indicated generally at 2. The magnetometer comprises a pair of magnetometer elements 3 and 4 supported at right angles to each other on a pivot shaft 5. As shown in FIGURE 2 each of the magnetometer elements is mounted in a nonmagnetic cylindrical member or casing 6. The magnetometer itself in each of the elements 3 and 4 comprises a cylindrical core 7 of magnetic material about which is wound a toroidal gating coil 8 which is driven by an alternating current gating source 9. A pickup coil 10 is wound around the outside of the core 7 and is connected by leads 11 and 12 to output terminals 13. The ambient magnetic field to be measured is indicated by the arrows 14. As previously explained and in accordance with conventional magnetometer operation the output across terminals 13 is a measure of the ambient magnetic field. Also as previously described it is desirable to reorient the magnetometer from time to time in order to obtain a correction factor where necessary.

The overall apparatus comprises a U-shaped frame 18 having a front leg 19, a base 20, and a rear leg 21. The rear leg 21 is provided with a bearing structure 22 which rotatably supports the rear end of the shaft 5. The front end of shaft 5 is provided with a reduced diameter portion 23 which is journalled in the front leg 19 of the support frame.

The thermal motor 1 is also supported on the frame 18. The motor comprises a cylindrical outer casing 26 made of nonmagnetic material such as aluminum. The casing is supported on the frame 18 by means of a mounting bracket 27, to which the casing 26 is fastened by screws 28 made of nonmagnetic material such as brass. Aluminum disk-shaped frame members 29 and 30 are secured in the opposite ends of cylinder 26 by brass screws 31 and 32 respectively. A support post 35 is rigidly bonded to the center of the end disk 29 and is of course made of nonmagnetic material. A mounting tube 36 is pressed over the post 35 so that it will not rotate with respect to the casing of the motor. The tube 36 is made of a nonmagnetic material which is also a good thermal conductor such as copper. A resistance heater package 37 is press fitted inside the tube 36. The heater package is also preferably made of nonmagnetic materials having high thermal conductivity. Also the heater is preferably a conventional counterwound bifilar resistance heater so that current flows in opposite directions in adjacent wires of the heater to cancel the magnetic fields which are caused by current flow. Similarly the leads 38 and 39 for the heater are twisted together to cancel the magnetic field.

The first thermal motor element 42 is a coil shaped bimaterial structure made of an inner strip 43 bonded to an outer strip 44. The inner and outer strips must have different coefficient of thermal expansion, and in the particular embodiment shown in the drawings the inner strip 43 has the greater coefficient of thermal expansion so that when the bimaterial element 42 is heated it will tend to unwind. In order to achieve the full teaching of the invention the strips 43 and 44 should be of nonmagnetic material. For example, "PJ" material manufactured by Texas Instruments, Inc. or "S–992" material made by the W. H. Chase Company. The inner end of the coil 42 is brazed to the copper tube 36 with silver solder.

The casing 26 is divided into two sections by a disk-shaped partition wall 46 made of good thermal barrier material such as phenolic or Micarta. The wall 46 is held in place in the casing by brass screws 47. The forward end of the mounting tube 36 is supported on a plug 48 fitted into a nylon sleeve 49 in the partition wall 46.

The output means for the motor is a composite shaft 52 having inner and outer ends portions 53 and 54, respectively. The inner portion 53 is a block of thermal insulation material such as phenolic or Micarta which is rotatably received in the nylon bushing 49. The outer portion 54 can be any nonmagnetic material such as aluminum and is journalled in a nylon bearing 55 in the forward end disk 30. Intermediate the end portions 53 and 54, the drive shaft structure includes a tubular copper portion 56 press fitted on the end portions for rotation therewith.

A second thermal motor element 57 is a bimaterial coil identical to the first thermal motor element 42. The inner end of coil 57 is silver soldered to the copper tube 56. A counterwound bifilar resistance heater 58 identical to the heater 57 is pressed into the tubing 56. The heater 58 has leads 59 and 60 which are twisted together to cancel magnetic fields as explained for the leads 38 and 39. A nonmagntic connecting rod 63 of low heat conductivity is joined to the outer end of each of the coils 42 and 57. By way of example, the rod 63 can be made of wood or phenolic, and epoxy can be employed to cement the rod to the coils 42 and 57. In order to permit arcuate movement of the rod 63, the partition wall is provided with an arcuate slot 64. It will be noted that the bimaterial coils 42 and 57 are connected in series between the frame member 29 and the output shaft 54, as distinguished from the conventional parallel connection.

In order to provide quick, positive and accurate positioning of the magnetometer units 3 and 4, an overcenter drive mechanism is connected between the motor output shaft 54 and the secondary shaft 5 which carries the magnetometer elements. The overcenter drive mechanism comprises a crank arm 65 attached to the drive shaft 54 and a crank arm 66 attached to the small diameter portion 23 of the secondary shaft 5. The crank arms are interconnected by means of a spring 67 which is attached to the arm 65 by a screw 68 and to the arm 66 by a screw 69. In order to limit the movement of the magnetometer units 3 and 4, stop means are provided in the form of an abutment plate 70 secured to the rear leg 21 of the frame 18 and positioned so that either one or the other of the magnetometers 3 and 4 will engage the plate to provide the limits of travel.

Figure 1:
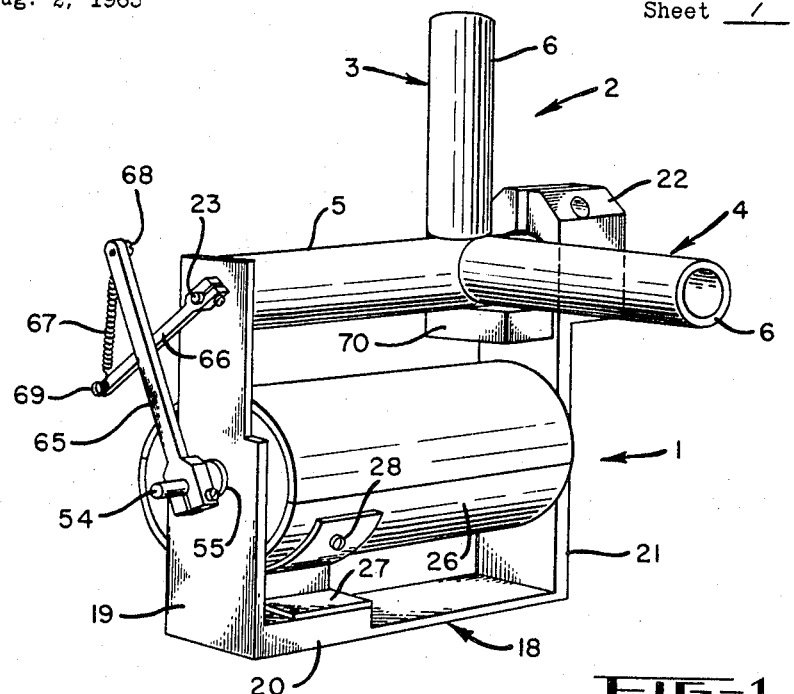
FIGURE 1 is a perspective view of the combined thermal motor and magnetometer apparatus.
Figure 3:
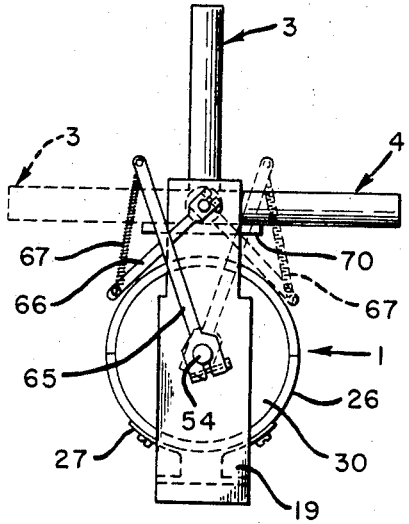
FIGURE 3 is a front elevational view of the apparatus of FIGURE 1 and showing the apparatus in solid lines in one position of operation and in dot dash lines in another position of operation.
Figure 4:
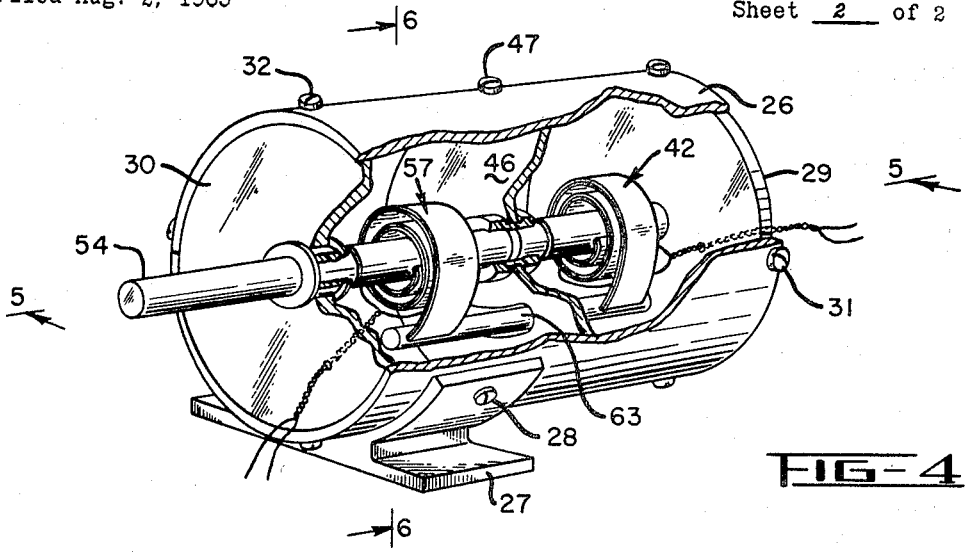
FIGURE 4 is a perspective view of the thermal motor portion of the apparatus with part of the motor casing cut away to show the internal parts.
Figure 5:
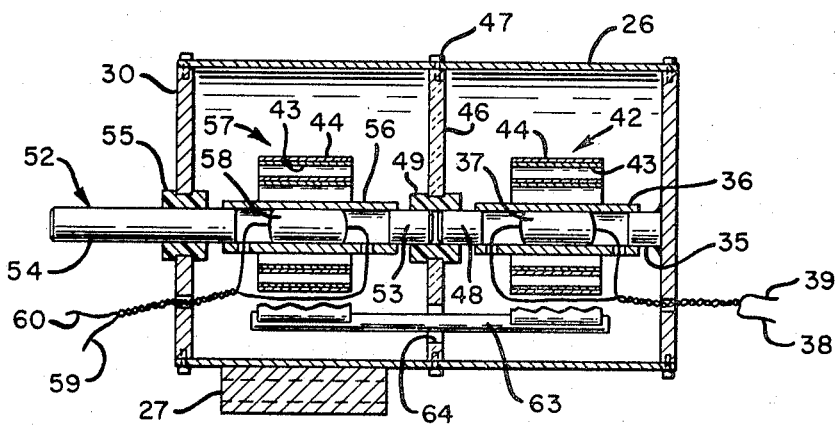
FIGURE 5 is a longitudinal cross sectional view of the thermal motor taken in the line 5—5 of FIGURE 4.

Operation of the apparatus is as follows. As shown in the various drawing figures the thermal motor has been actuated to position the magnetometer element 4 against the stop plate 70. Since the thermal motor coils 42 and 57 are designed to unwind when they are heated, the arrangement shown in the drawings means that the coil 42 has been heated by passing current through its resistor 37. Thus with the inner end of coil 42 held stationary and the coil heated to cause it to unwind, it will move counterclockwise as viewed in FIGURE 4. Such movement will move the connecting rod 63 counterclockwise and will thereby turn the drive shaft 54 counterclockwise through the connecting medium of the coil 57 which at this time is not being heated and serves the sole function of a connecting member. The counterclockwise movement of shaft 54 turns the crank arm 65 counterclockwise to position the elements as shown in the solid line positions in FIGURES 1 and 3. When it is desired to move the magnetometer elements 90° to the position shown dotted in FIGURE 3, the motor coil 57 is heated by passing a current through its resistor 58. When the resistor 58 is heated, the coil 57 will tend to unwind in the same manner as coil 42. However, whereas the inner end of coil 42 was held fixed, the outer end of coil 57 is in effect held stationary. Thus as coil 57 tends to unwind it will rotate tube 56 clockwise as viewed in FIGURE 4 and thereby rotate the drive shaft portion 54 clockwise. The manner in which the outer end of coil 57 is held stationary is of course through the medium of connecting rod 63 and the coil 42 to the stationary mounting tube 36. When the drive shaft 54 is thus rotated clockwise it will move the crank arm 65 clockwise to the dotted position shown in FIGURE 3 and through the medium of spring 67 will thus drive the crank arm 66 counterclockwise to the position shown dotted in FIGURE 3. As a result the magnetometer elements will be turned counterclockwise 90° so that element 3 will become horizontal as shown in the drawings and element 4 will become vertical. It should be understood that the bimaterials coils could be constructed so that they would wind tighter when heated rather than unwind, and the operation would simply be reversed.

Figure 6:
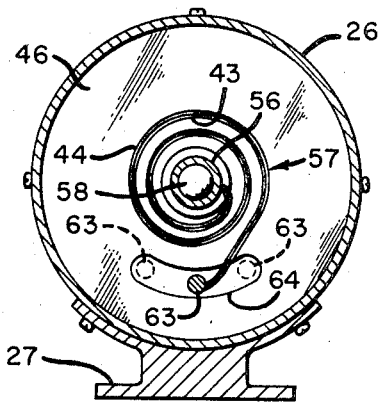
FIGURE 6 is a cross sectional view normal to the axis of the motor and taken on the line 6—6 of FIGURE 4.

In order to conserve power it is preferable to permit the last-heated motor coil to cool down to the ambient temperature before energizing the other motor coil to drive the shaft 54 in the opposite direction. When both of the motor coils 42 and 57 are at the ambient temperature, the connecting rod 63 will be near the left end of the arcuate slot 64 as shown dotted in FIGURE 6, and the crank arm 65 will be urged by the coils 42 and 57 toward a straight up position as viewed in FIGURE 3. However, it should be understood that the crank arm 65 will not actually move to a straight up position because such movement will be prevented by the force of spring 67. Then when motor coil 42 is heated it will move the connecting rod 63 counterclockwise and thus drive the crank arm 65 over-center to position the crank arm 65 in the position shown solid in FIGURE 3, at which time the connecting rod 63 will be in the center position shown solid in FIGURE 6. As the motor coil 42 cools back to ambient, it will return the connecting rod 63 to the left hand position shown dotted in FIGURE 6. This motion will again tend to position the crank arm 65 straight up but the spring 67 will again resist this motion. If motor coil 57 is not energized until coil 42 has cooled to ambient, the coil 57 need only drive from the position where the connecting rod 63 is near the left end of the slot 64 rather than near the middle of the slot.

Obviously, one motor coil can be energized before the other cools down if power conservation is not important. More specifically, if one coil is energized before the other cools down, the energized coil must move farther to offset the movement still imparted by the uncooled coil. Thus if coil 42 is energized while coil 57 is still heated, coil 42 will be required to drive the connecting rod 63 from the left position shown dotted in FIGURE 6 to the right position shown dotted in FIGURE 6, in order to drive the crank arm 65 from the right dotted position to the left solid position in FIGURE 3. Similarly, if coil 57 is energized while coil 42 is still heated, and therefore connecting rod 63 is to the right of its left solid position, coil 57 must move farther than if the connecting rod 63 were in the left solid position.

It should be understood that a change in ambient temperature has no detrimental effect since both of the coils 42 and 57 will tend to move their outer ends in the same direction to merely shift the ambient temperature position for the connecting rod 63 without causing any movement of the drive shaft 54. In other words the thermal motor is self compensating because any change in ambient temperature will cause each of the coils 42 and 57 to tend to impart drives which are exactly equal in magnitude and opposite in direction to exactly counteract each other and result in no drive being imparted to the output shaft.

It was hereinbefore explained that in order to obtain a correction factor for a magnetometer it is necessary to rotate the core of the magnetometer through 180° The reason why the specific embodiment described herein provides a turning motion of only 90° will now be described. The application for the specific embodiment described herein is in a satellite which is continually turning about a spin axis. The magnetometer 2 is mounted on the satellite with the axis of the magnetometer 3, as shown solid in the drawings, positioned on the spin axis of the satellite. Thus every time the satellite makes a half revolution it will turn the magnetometer unit 4 through 180° to provide automatically the required turning for a correction factor on the unit 4. However, the magnetometer unit 3 obtains no beneficial turning of the axis of its core. However if the magnetometer unit 3 is turned to lie in the plane previously occupied by the unit 4 it will be continuously rotated through 180° for each half turn of the satellite. Accordingly, the thermal motor for the specific embodiment is only required to turn the magnetometer 2 through 90° rather than 180°. However, it should be understood that the principles embodied in the thermal motor mechanism can be utilized to turn a magnetometer through 180° where required.

Although specific details of the present invention are shown and described herein, it is to be understood that modifications may be made therein without departing from the spirit and scope of the invention as set forth in the appended claim.

What is claimed is:

1. A thermal motor for positioning a load in either a first position or a second position comprising a cylinder with first and second ends and a longitudinal axis, first and second walls closing said first and second ends, respectively, a heat-insulative wall located within said cylinder, normal to said axis, dividing the interior into first and second compartments, a first shaft on said axis rotatably supported by said first wall and said heat-insulative wall, said first shaft extending outside said cylinder, a second shaft on said axis fixed between said heat-insulative wall and said second wall, first and second spiral bimetallic elements in said first and second compartments, respectively, the inner ends of said first and second bimetallic elements attached to said first and second shafts, respectively, first and second electrical heaters in said first and second shafts, said heaters being within said bimetallic elements and capable, when energized, of causing said elements to unwind, a heat-insulative rod connected to the outer ends of said bimetallic elements, said heat-insulative wall having an arcuate slot therein through which said connecting rod passes, an output shaft adapted to couple to said load, a frame fastened to said cylinder and rotatably supporting said output shaft, a stop fastened to said frame adjacent said output shaft, said stop being adapted to limit said load between said first and second positions, first and second crank arms each having first and second ends, said first ends connected to said first shaft and said output shaft, respectively, a spring interconnecting said second ends, said crank arms and springs causing said load to be in said first or second position, and the selective energization of said heaters causing said load to alternate from one of said positions to another.

References Cited
UNITED STATES PATENTS

| | | | |
|---|---|---|---|
| 1,987,717 | 1/1935 | Smith | 310—4.1 |
| 1,989,828 | 2/1935 | Smulski | 310—4.1 |
| 2,063,705 | 12/1936 | Smulski | 310—4.1 |
| 2,323,738 | 7/1943 | Vassar | 310—4.1 |
| 2,350,170 | 5/1944 | Kinnard | 310—4.1 |
| 2,518,513 | 8/1950 | Wyckoff | 324—43 |

RUDOLPH V. ROLINEC, *Primary Examiner.*

R. J. CORCORAN, *Assistant Examiner.*

U.S. Cl. X.R.

318—117; 324—43